(12) United States Patent
Sahm et al.

(10) Patent No.: US 8,659,815 B2
(45) Date of Patent: Feb. 25, 2014

(54) OPTICAL BANK AND METHOD FOR PRODUCING THE OPTICAL BANK

(75) Inventors: Alexander Sahm, Berlin (DE); Martin Maiwald, Berlin (DE); Christian Fiebig, Berlin (DE); Katrin Paschke, Potsdam (DE)

(73) Assignee: Forschungsverbund Berlin E.V., Berlin (DE)

( * ) Notice: Subject to any disclaimer, the term of this patent is extended or adjusted under 35 U.S.C. 154(b) by 185 days.

(21) Appl. No.: 13/377,123

(22) PCT Filed: Jun. 9, 2010

(86) PCT No.: PCT/EP2010/058061
§ 371 (c)(1),
(2), (4) Date: Jan. 25, 2012

(87) PCT Pub. No.: WO2010/142711
PCT Pub. Date: Dec. 16, 2010

(65) Prior Publication Data
US 2012/0120479 A1 May 17, 2012

(30) Foreign Application Priority Data
Jun. 10, 2009 (DE) .................... 10 2009 024 944

(51) Int. Cl.
*G02F 1/35* (2006.01)
(52) U.S. Cl.
USPC ........................................... 359/288
(58) Field of Classification Search
USPC .................. 359/288, 240, 238, 237
See application file for complete search history.

(56) References Cited

U.S. PATENT DOCUMENTS

| 6,665,105 | B2 * | 12/2003 | Wipiejewski ............... 359/240 |
| 7,079,559 | B2 | 7/2006 | Varghese et al. |
| 7,446,929 | B1 * | 11/2008 | Jayaraman et al. .......... 359/299 |
| 2008/0187014 | A1 | 8/2008 | Takagi et al. |

FOREIGN PATENT DOCUMENTS

| DE | 70 12 258 U | 4/1971 |
| DE | 91 08 256.0 U1 | 11/1991 |
| DE | 10 2004 057 454 A1 | 6/2006 |
| EP | 1 602 967 A1 | 12/2005 |

OTHER PUBLICATIONS

Maiwald, et al., "Second-harmonic-generation microsystem light source at 488nm for Raman spectroscopy," Optics Letters, OSA, Optical Society of America, Washington, DC, US LNKD-DOI:10.1364/OL.34.000217, vol. 34, No. 2, Jan. 15, 2009, pp. 217-219, XP001521848 (On Order).

* cited by examiner

*Primary Examiner* — Tuyen Tra
(74) *Attorney, Agent, or Firm* — Christie, Parker & Hale, LLP

(57) ABSTRACT

The invention relates to an optical bank (1) comprising a carrier (10) for receiving optical components (60, 70) and a crystal (30) that is mechanically connected to the carrier, for changing the frequency of the light irradiated into the crystal (30) from a light source (50). Two rails (12) are arranged essentially in parallel on the carrier (10). The crystal (30) and the carrier (10) are mechanically connected by a surface of the rails (12), facing away from the carrier (10). A heat conducting element (20) is arranged on the crystal, said heat conducting element being applied to the surfaces of the rails (12), that face away from the carrier (10).

14 Claims, 4 Drawing Sheets

OPTICAL BANK AND METHOD FOR PRODUCING THE OPTICAL BANK

CROSS-REFERENCE TO RELATED APPLICATION

Figure 1:
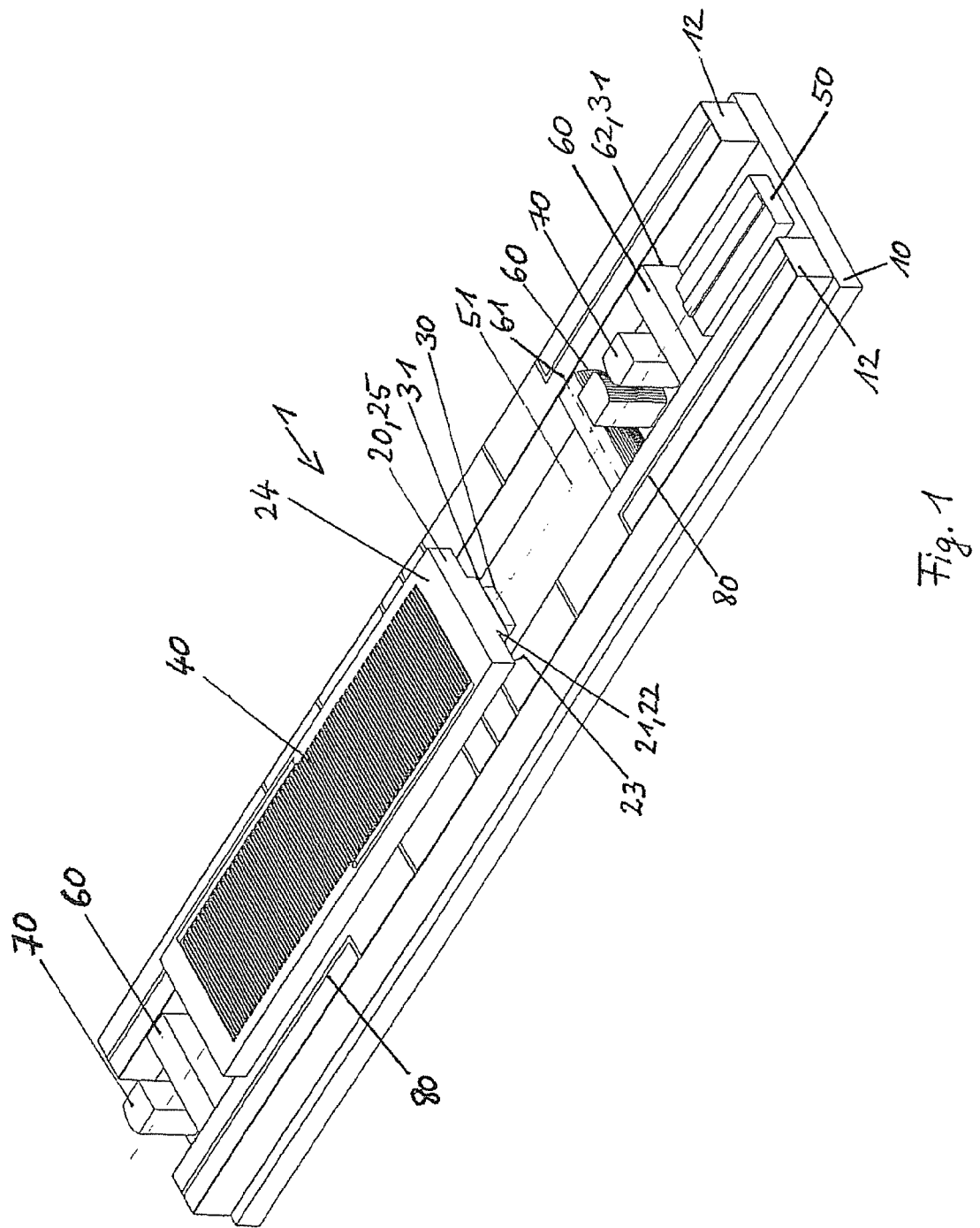

This application is a National Phase Patent Application and claims the priority of International Application Number PCT/EP2010/058061, filed on Jun. 9, 2010, which claims priority of German Patent Application Number 10 2009 024 944.3, filed on Jun. 10, 2009.

The present invention relates to an optical bank, in particular a micro-optical bank, with at least one carrier for receiving optical components, and at least one crystal mechanically connected with the carrier for changing the frequency of a light irradiated into the crystal from a light source, wherein at least two rails are arranged on the carrier essentially parallel to each other, and each exhibit at least one surface facing away from the carrier. In addition, the present invention relates to a method for manufacturing the optical bank according to the invention.

The optical bank according to the invention is used for mounting and, if necessary, heating a $LiNbO_3$ crystal, in particular a periodically polarized $LiNbO_3$ crystal. Changing the temperature of the crystal makes it possible to achieve a phase adjustment, and to thereby generate non-linear optical effects through frequency modification, in particular frequency doubling.

In particular, the present invention is aimed at a hybrid diode laser system, i.e., a laser system in which the laser diode representing the active component is combined with a lens system and a crystal into one system.

Known in the art are optical systems in which the optical components are set up individually or arranged together on a shared carrier. The crystal is here usually mounted and heated from its underside, specifically by way of its surface resting on the carrier. The disadvantage to this embodiment is that the crystal becomes at least partially misaligned due to its temperature-variable heat expansion and resultant change in shape and/or volume. Such a misalignment leads to a loss in coupling efficiency. This is exacerbated even further by the additional heat expansion of an adhesive situated between the crystal and carrier. Another disadvantage is the relatively high loss in heat by the crystal owing to its large contact surface on the carrier.

Hence, the problem with conventional optical banks has to do with an undesired expansion and/or shifting of lenses or crystals as the result of temperature changes. This impermissible expansion or shifting of the crystal is accompanied by faulty light frequencies at the output of the crystal, and possibly faulty light scatters or light focussing.

Therefore, the object of the invention is to provide an optical bank as well as a method for manufacturing the optical bank, wherein the optical bank is designed in such a way as to exhibit a simple structural and thermally optimized design, while still preventing or diminishing undesired misalignments of individual optical components. This object is achieved by the optical bank according to the invention as described in claim 1, as well as by the method for manufacturing the method according to claim 14. Advantageous embodiments of the optical bank are indicated in subclaims 2 to 13.

The invention provides an optical bank, in particular a micro-optical bank, with at least one carrier for receiving optical components, and at least one crystal mechanically connected with the carrier for changing the frequency of the light irradiated into the crystal from a light source, wherein at least two rails are arranged on the carrier essentially parallel to each other, and each exhibit at least one surface facing away from the carrier.

According to the invention, the optical bank is designed in such a way that the crystal is mechanically connected with the carrier by way of the surfaces of the rails facing away from the carrier, wherein a heat conducting element is arranged on the crystal to heat the crystal in a targeted fashion, and abuts the surfaces of the rails facing away from the carrier.

In other words, the weight force of the crystal is applied proportionately to the rails from above in order to position the crystal on the optical bank given a horizontally installed optical bank. The crystal is here not placed on the carrier, but rather the crystal is placed or positioned in such a way as to introduce its weight force (proportionately) into the carrier by way of the rails. The invention is here not to preclude a case where the optical bank is not situated horizontally in the room, but in a rotated position. Even with the optical bank positioned in this way, contact is to take place via the surfaces of the rails facing away from the carrier.

Given an essentially rectangular cross section of the rails, the respective surface of the rails facing away from the carrier is the upper top side that runs essentially parallel to the base of the carrier.

In particular, the advantage to the optical bank according to the invention is that the heat expansion of the crystal toward the longitudinal axis of the crystal can be absorbed without tension by the heat conducting element, and thus is just barely noticeable. This eliminates or largely diminishes thermally induced tensions along with losses in efficiency resulting from misalignment. A laser is advantageously used as the light source. In particular, the optical bank according to the invention is suitable for the installation or mounting of $LiNbO_3$ crystals.

As a consequence, contact with the surfaces of the rails facing away from the carrier is established between these surfaces and the heat conducting element, which is rigidly connected with the crystal. Therefore, the crystal is indirectly connected with the surfaces of the rails, specifically by way of the heat conducting element. In addition to controlling the temperature of the crystal, the heat conducting element serves as a receptacle for securing and positioning the crystal. Given a horizontally arranged optical bank, the weight force of both the crystal and heat conducting element are thus proportionately introduced via the latter into the surfaces of the rails.

In particular, it is here provided that the crystal be suspended on the heat conducting element. When the heat conducting element is resting on the rails, the crystal is situated on the side of the heat conducting element that faces the carrier. If the rails, heat conducting element and crystal are properly dimensioned, the crystal is hence suspended between the rails. The advantage to this configuration is that, given a heat expansion by the crystal perpendicular to its direction of longitudinal extension, the expansion can be compensated by a corresponding thickness of the heat conducting element, since the thickness of the heat conducting element is also altered during a temperature change. Therefore, the middle of the crystal cross section can again be positioned as desired in relation to the beam of light, even given a variable expansion owing to variable temperatures.

It is advantageously provided that the crystal be secured to the heat conducting element by means of an adhesive or cohesive bond. In other words, an adhesive bond is preferably used to attach the crystal to the heat conducting element.

The heat conducting element should essentially be a plate with a flat design. This plate can be profiled if need be. The thickness of the plate-like heat conducting element should here be dimensioned in such a way as to allow for the compensation of heat expansion by the crystal. The heat expansion coefficient of the heat conducting element should here differ only negligibly, if at all, from the heat expansion coefficient of the crystal. The crystal can here exhibit a heat expansion coefficient in at least one axis of $\alpha_{Crystal}$=15 ppm/K, and the heat conducting element can exhibit a heat dissipation coefficient $\alpha_{heat\ conducting\ element}$=17 ppm/K.

The heat conducting element can here be equipped with one or more pedestal regions, wherein the pedestal regions essentially extend in the direction of longitudinal extension of the heat conducting element and the crystal secured thereto. The heating element can exhibit a pedestal element to which the crystal is attached, wherein the two sides of the pedestal element exhibit areas where the heat conducting element can abut the surfaces of the rails, and these areas are each spaced essentially the same distance from the pedestal region. In other words, the pedestal region is arranged essentially in the middle of the heat conducting element, and advantageously positioned symmetrically relative to the abutment or placement regions. The heat conducting element thus has a T-shaped cross section, which preferably extends over the entire length of the heat conducting element. The pedestal region is here preferably an integral part of the heat conducting element.

An alternative embodiment provides that the heat conducting element exhibits two pedestal elements, wherein the two pedestal elements are essentially arranged parallel to each other, and simultaneously at least partially comprise the areas where the heat conducting element abuts the surfaces of the rails, wherein the crystal is attached to the heat conducting element between the two pedestal elements. The embodiment with two pedestal elements is advantageous in particular in compensating for the heat expansion by the crystal perpendicular to its direction of longitudinal extension, since the heat conducting element also expands due to heat supply.

Because the heat conducting element is placed on the rails, a heat expansion is accompanied by a downward shift in the center of the crystal cross section and concurrently by a lifting of the entire heat conducting element, thereby at least partially offsetting the heat expansion by the crystal perpendicularly to its direction of longitudinal extension.

Therefore, such a heat conducting element configured with two pedestal elements exhibits a roughly U-shaped cross section, which can extend over the entire length of the heat conducting element, if needed. In an alternative embodiment, the pedestal elements are not continuous, but only situated on the outer corners. The present invention is here not limited to one of the two embodiments, but can rather be designed in such a way that the heat conducting element exhibits both the centrally arranged pedestal element and the two pedestal elements situated at the outer edges in the abutment region.

The crystal is advantageously heatable, and designed to enable a phase adjustment based on the change in crystal temperature, so that the acceptance wavelength of the light entering into the crystal can be modified. To this end, the optical bank according to the invention encompasses at least one heating element for changing the crystal temperature on the heat conducting element on the side lying opposite the crystal.

In particular, the optical bank is advantageously designed when at least one FAC lens is arranged between two rails, wherein the FAC lens is attached via a respective adhesive bond between a face of the FAC lens and a rail. Such FAC lenses are cylinder lenses made of special optical glass, which in particular exhibit columniation characteristics.

As a consequence, the face running transverse to the direction of longitudinal extension of an FAC lens serves as an adhesive surface to a lateral surface of a rail. Therefore, the FAC lens is not bonded to the carrier, but rather glued between the rails, if possible without contacting the carrier surface. In particular, the advantage to this embodiment is that the FAC lenses are bonded in the uncritical axis. This means that the setting and associated shrinkage of the adhesive will generate no tensions in the FAC lens, and the central region of the FAC lens will also not shift. Several FAC lenses are typically arranged between the rails, if necessary in conjunction with so-called SAC lenses. The SAC lenses are also bonded in their uncritical axes (perpendicularly).

In addition to an optimized attachment of lenses, this yields a mechanical stiffening of the optical bank. As a result, the light irradiated into the crystal from a light source through the FAC lenses can only be distorted or altered to a negligible extent given a temperature-induced change in the shape and/or volume and/or position of the optical components. The rails of the optical bank thus have five functions, specifically to receive the crystal on their top side, to receive the FAC lenses between them, to stiffen the optical bank, and to dissipate heat from the crystal and thermotechnically insulate the crystal against the light source. In order to provide a compact module, it is further envisaged that the optical bank also encompass at least one light source mechanically connected with the carrier to generate a beam of light to be guided through the crystal. This light source is preferably a laser secured directly to the carrier.

In order to optimally conduct heat and adjust the heat expansion coefficient of the heat conducting element to the heat expansion coefficient of the crystal, it is provided that the material of the heat conducting element is copper or a copper alloy. The invention is here not to be limited to these materials; rather, any material having a corresponding heat expansion coefficient can be used. Tests have shown that steel alloys are best suited for certain requirements.

The embodiment with two pedestal regions on heat conducting elements advantageously provides that the pedestal regions each exhibit a height hS, and the crystal exhibits a height hK, wherein the two heights are in a ratio of hS/hK=0.3 to 0.7 relative to each other. The height is here measured from the edge of the pedestal element or crystal spaced the farthest away from the plane clamped by the heat conducting element, up to the surface of the heat conducting element facing the pedestal regions or crystal. In pedestal regions with a rectangular cross section, this simultaneously represents a limiting edge of a surface lying on the rails. The ratio for the heights should here preferably correspond to the heat expansion coefficients of the used materials in the pedestal regions or crystal. In a preferred ratio of heat expansion coefficients $\alpha_{heat\ conducting\ element}/\alpha_{crystal}$=0.44, the ratio hS/hK should also be equal to 0.44. A special embodiment of the optical bank according to the invention provides that power lines be arranged on at least one rail, in particular its top side that brings about the mechanical connection with the crystal. Power lines that are realized with structured metal layers and preferably present in the area where the rail mechanically contacts the heat conducting element can be used to establish at least one electrical contact between the rail and heat conducting element, so that at least one electrical contact with the crystal is realized, regardless of the position of the crystal in the longitudinal direction of the carrier.

Also provided according to the invention is a method for manufacturing the optical bank according to the invention, which provides that, when adhesively bonding the crystal to the heat conducting element, the crystal must be heated to a temperature measuring 17/15 of the selected curing temperature of the adhesive for attaching the crystal. This ensures that operationally induced temperature changes, in particular instances of intensive heating, will be unable to produce impermissible tensions in the crystal and/or adhesive bond.

Therefore, the advantage to the present optical bank is that it can be used to mount several FAC lenses in an uncritical axis and attach them by way of an adhesive bond. All active elements on the bank, e.g., laser diodes, which are each to be actuated separately from each other, along with thermocouples, cooling elements and linear motors for repositioning the laser, can here be easily supplied with power and/or actuated via the power lines secured to the rails. The active elements can here essentially be thermally decoupled from each other. Another advantage involves the mechanical stiffening of the bank.

The heating caused by the power lines is diverted or distributed by the way in which they are arranged on the rails, and hence at a sufficient distance from the laser. This also yields a thermal decoupling of the power lines from the laser.

As a result of the preferred suspended arrangement of the crystal on the heat conducting element, the critical configuration axis of the entire crystal package is turned, and compensated by a suitable design. This improves the ability to position the crystal when using flip-chip technology, since the crystal is arranged on the side of the heat conducting element facing the carrier during assembly. In addition, the suspended installation of the crystal better protects the latter against drafts, and against contamination caused by falling particles. The structural design according to the invention enables relatively simple manufacturing processes for producing the optical bank, e.g., by extruding the carrier, along with thick-layer techniques for incorporating the power lines. As a result, the optical bank can be fabricated with a distinctly reduced time and production outlay.

Therefore, the optical bank is used to manufacture compact laser modules, which can also be used as hand lasers, if needed. For example, such a compact module can advantageously be used for display applications, spectroscopic applications, and in the area of laser cooling.

The invention will be explained below based on the attached drawings.

Figure 2:
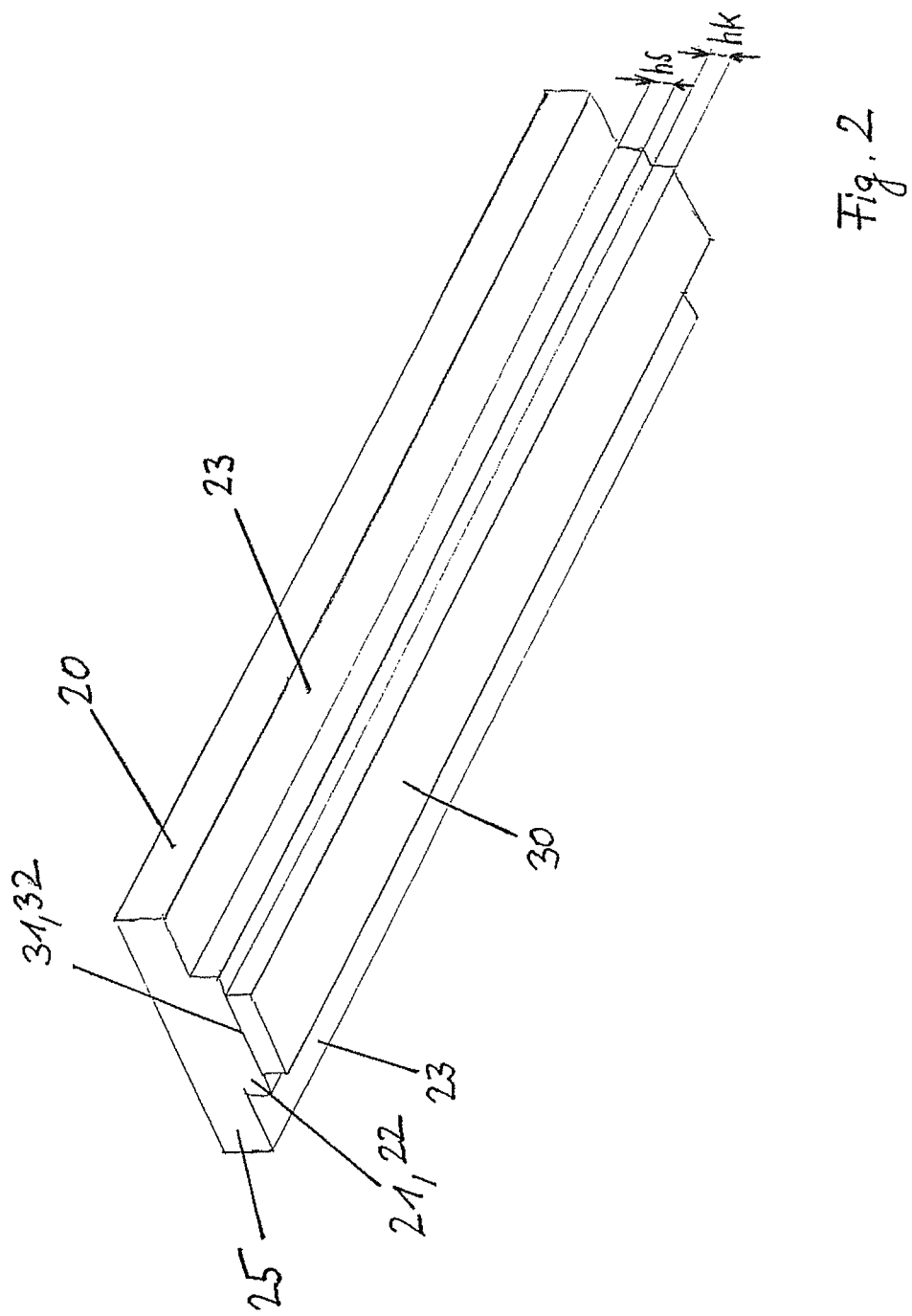
Figure 3:
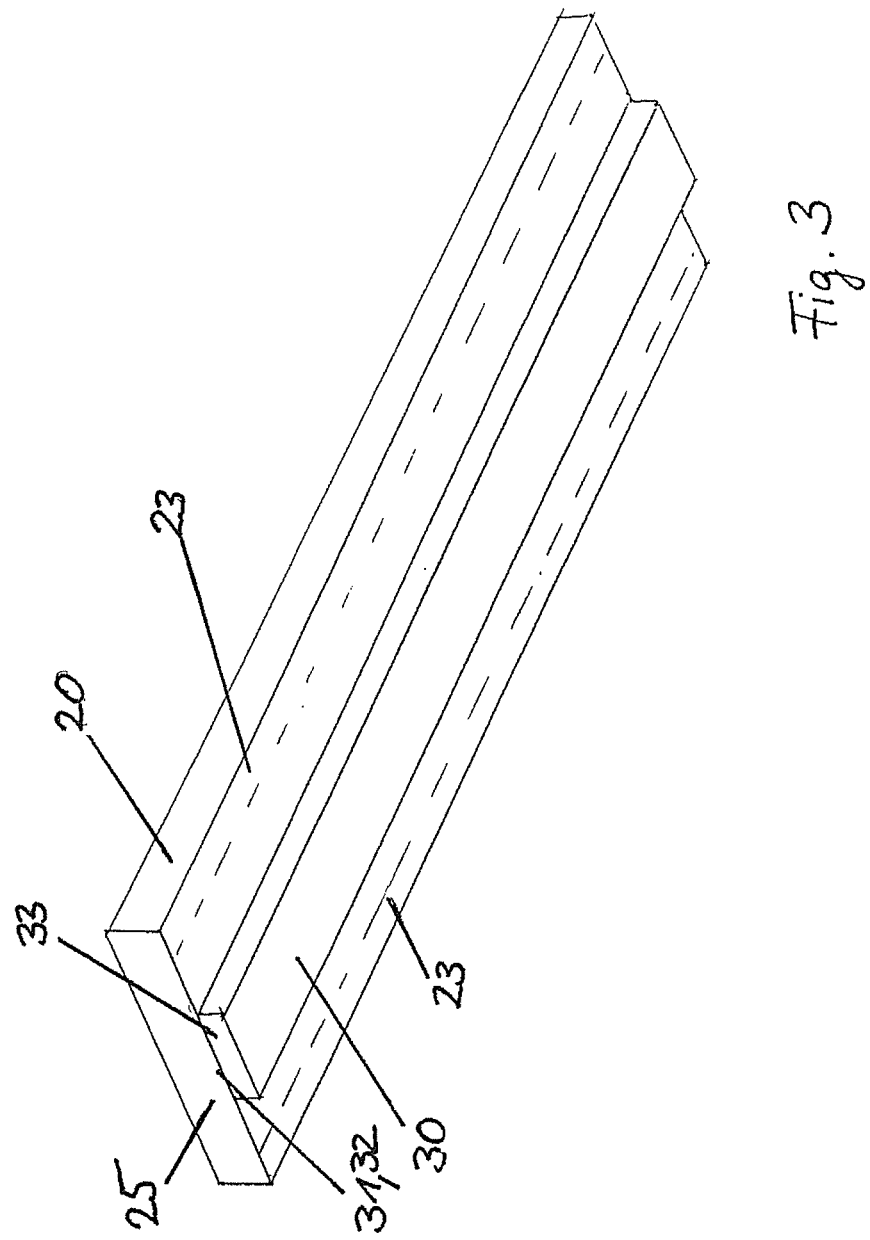
Figure 4:
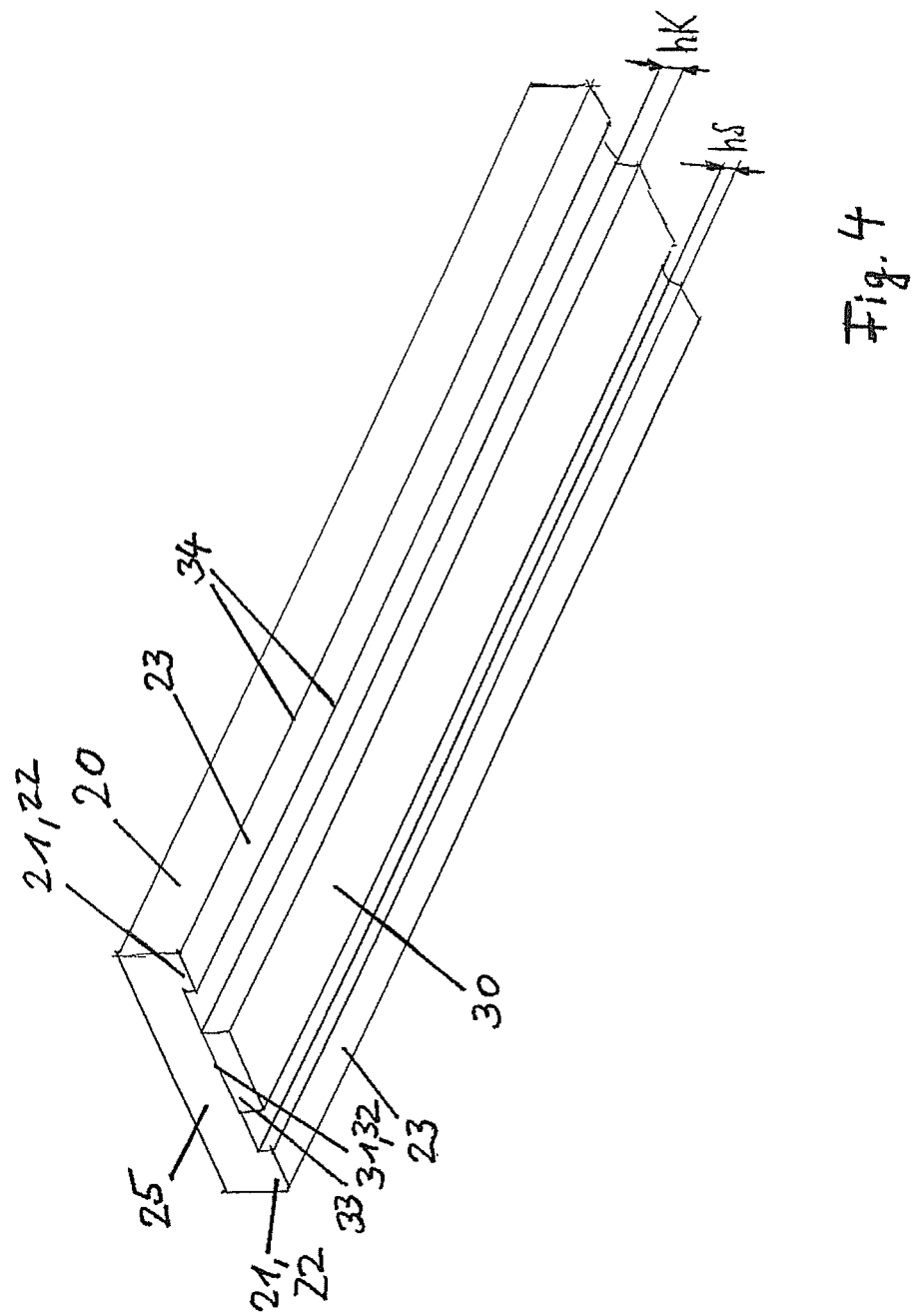

Shown on:

FIG. 1: is a perspective view of an optical bank according to the invention,

FIG. 2: is a perspective view of a first embodiment of a heat conducting element, FIG. 3: is a perspective view of a second embodiment of a heat conducting element, and FIG. 4: is a perspective view of the heat conducting element with pedestal elements.

The optical bank 1 shown on FIG. 1 essentially encompasses a carrier 10, on which two rails 12 are arranged. These rails 12 can here be individual parts, or even an integral component of the carrier 10. The heat conducting element 20 lies on both sides of the rails 12. The crystal 30 is suspended on the heat conducting element 20. In order to secure the crystal 30 to the heat element 20, an adhesive bond 31 is realized on the respective contact surfaces. In order to realize a heat input into the crystal 30, a heating element 40 is situated on the heat conducting element 20 on the side lying opposite the crystal 30, and hence on the surface 24 facing away from the carrier. Supplying power to this heating element 40 heats up the heat conducting element 20, and hence heats up the crystal 30 attached thereto, so that the light beam 51 emitted by a light source 50 secured to the carrier 10 can be subjected to a phase adjustment.

Before the light beam 51 emitted from the light source 50 enters into the crystal 30, it is guided according to the invention through two FAC lenses 60 as well as the SAC lenses 70 arranged between FAC lenses 60. The SAC lenses 70 are used for lateral columniation in one direction.

The arrangement of an FAC lens 60 and another SAC lens 70 is also provided in the beam direction after the crystal 30. The faces 62 of the FAC lenses 60 are attached to the rails 12 by means of adhesive bonds 31, so that their longitudinal sides advantageously exhibit no contact with the carrier 10. As a consequence, the FAC lenses 60 are attached in the uncritical axis 61 denoted with the dashed line. The length of the rails 12 allows several FAC lenses 60 to be secured to the latter in sequence.

The rails 12 are advantageously provided with power lines to supply energy to (opto)electric components on the optical bank. The rail height creates a relatively large distance between the power lines 80 arranged on the rails 12 and the light source 50, so that the power lines are largely decoupled from the light source from a thermotechnical standpoint.

The power lines 80 can be realized via a metallic structuring for the rails 12. For example, this metallic structuring can involve the use of structured copper. The differing thickness of these copper structures may make them suitable for conducting currents of varying amperage levels. The rails 12 and potentially the carrier 10 advantageously consist of aluminum oxide, so that undesired heat can be dissipated in a targeted manner. The carrier 10 should advantageously exhibit a width of 5 to 20 mm, in particular 10 mm, and a length of 30 to 70 mm, in particular 50 mm. Arranging the rails 12 on the carrier 10 results in an increase in the axial and polar resistance moment, so that the bending and torsion stiffness of the optical bank is elevated.

However, the invention is here not limited to the use of a heat conducting element 20; rather, it can alternatively also be provided that a correspondingly widely formed crystal itself come to lie on the rails 12.

In this embodiment, the crystal 30 advantageously encompasses a deepened area that extends until into the light beam 51.

In both embodiments, the height of the rails 12 preferably lies between 1 and 3 mm, and more advantageously measures 1.6 mm. The rail height should be dimensioned in such a way that the faces 72 of the FAC lenses 60 can be adhesively bonded between the rails 12, without 60 coming into direct contact with the carrier 10.

Heating the crystal 30 via the heat conducting element 20 using the heating element 40 makes it possible to alter the lattice period of the crystal 30 by changing the refraction index. In turn, this makes it possible to achieve a phase adjustment of the crystal to the light irradiated into the crystal, so that a maximum of visible light can be generated.

A UV adhesive should advantageously be used as the adhesive for realizing the adhesive bonds 31, so as to avoid additional thermal loads on the optical bank while fabricating the adhesive bonds.

As a consequence, the optical bank functions as a tension-minimizing mount for optical components, concurrently providing mechanical reinforcement for the optical bank. A stiff mechanical system is created as a result, which in conjunction with a cover or hood can comprise one part of a housing, if necessary.

For example, the power lines 80 can be applied to the rails 12 by means of a special printing technology.

The power lines 80 lead from external power sources (not shown) to optoelectronic components, e.g., the heating element 40 and/or that of the light source 50.

The adhesive bonds 31 are designed in such a way that they also can conduct heat. The adhesive bonds advantageously exhibit a heat expansion coefficient similar to that of the parts connected via the adhesive bonds 31. In particular copper or a copper alloy is possible as the material for the heat conducting element 20, wherein the heat expansion coefficient of the material comprising the heat conducting element 20 is advantageously exactly as large as the heat expansion coefficient of the crystal 30. in an alternative embodiment, the heat conducting element can also be made out of steel, in particular high-grade steel. The adhesive bond 31 on the crystal differs from that for the lenses. The crystal is adhesively bonded with a thermally conductive adhesive, which is cured by temperature. The lenses and crystal mount are bonded with UV-curing adhesive.

FIGS. 2 to 4 depict various embodiments of the heat conducting element 20. FIG. 2 shows an advantageous embodiment that is also used in the optical bank depicted on FIG. 1. The central region of this heat conducting element 20 exhibits a pedestal element 21, which through its arrangement leaves open placement regions 23 on the lower side areas of the heat conducting element 20. The crystal 30 is attached to the pedestal element 21 by means of an adhesive bond 31. The crystal 30 is here narrower than the pedestal element 21, so that shoulders are present on either side of the crystal 30. The height of the pedestal element 21 is labeled with hS, while the height of the crystal is labeled with hK. By placing the heat conducting element on the rails 12 in the placement region 23 as shown on FIG. 1, the crystal 30 becomes suspended in the area of the light beam 51. Changes in the geometric dimensions of the heat conducting element 20 or the crystal 30 owing to temperature changes are relatively uncritical.

The T shape of the heat conducting element 20 causes the crystal 30 to project into the optical axis of the laser. The heat expansion coefficients for the materials used in the heat conducting element 20, crystal 30 and adhesive bond 31 are adjusted to each other. The heat expansion coefficient for the crystal should be $\alpha_{crystal}=15$ ppm/K in the direction of the beam, the heat expansion coefficient for the heat conducting element should be $\alpha_{heat\ conducting\ element}=17$ ppm/K, and the heat expansion coefficient for the adhesive bond should be $\alpha_{adhesive\ bond}=15$ ppm/K. In the manufacturing process according to the invention, heating by a factor of 17/15 of the curing temperature of the adhesive bond takes place while adhesively bonding the crystal.

FIG. 3 depicts a simple embodiment of the heat conducting element 20, in which the heat conducting element 20 is essentially shaped like a flat plate. The crystal 30 is in turn situated in a central region on the bottom side of the heat conducting element 20, so that lateral edge areas can be used as the placement regions 23.

FIG. 4 shows an advantageous embodiment of the heat conducting element 20, in which two pedestal elements 21 are arranged on the bottom side of the heat conducting element 20 on the respective longitudinal edges, and their downwardly pointing surfaces simultaneously realize the placement regions 23 for placement on the rails 12.

In an alternative embodiment (not shown), the pedestal elements 21 are not continuous, but rather only situated on the outer corners.

Such an interrupted pedestal element configuration can be encountered in each of the depicted pedestal arrangements.

The crystal 30 is attached between the two pedestal elements 21 via an adhesive bond 31. Given a rising temperature of the heat conducting element, and hence of the crystal 30, the thickness of the crystal 30 increases, and its lower surface thus drops. This would cause the center cross section of the crystal to shift out of the light beam 51. However, given the way in which the pedestal elements 21 lying on the rails 12 are arranged, the rise in temperature also leads to an increase in thickness with respect to the pedestal elements 21 or heat element 20, so that the surface of the heat conducting element 20 to which the crystal 30 is attached would assume a greater distance from the carrier 10. Therefore, selecting the right materials, and hence heat expansion coefficients, makes it possible to compensate for the expansion of the crystal 30.

Another way to compensate for heat expansions involves heating the heat conducting element 20 more intensively on its placement regions 23, so as to achieve a stroke adjusted to the heat expansion of the crystal 30.

In order to prevent the adhesive bonds 31 between the crystal 30 and heat conducting element 20 from contaminating the heat conducting element faces 25 or pedestal element faces 22 and crystal faces 33, it is provided that the crystal face 33 and, depending on placement, the pedestal element face 22 or heat element face 25 be provided with a beveled or rounded segment in which squeezed out adhesive can accumulate during the adhesive bonding process.

REFERENCE LIST

| | |
|---|---|
| Optical bank | 1 |
| Carrier | 10 |
| Rail | 12 |
| Heat conducting element | 20 |
| Pedestal element | 21 |
| Pedestal element face | 22 |
| Placement region | 23 |
| Surface facing away from carrier | 24 |
| Heat conducting element face | 25 |
| Crystal | 30 |
| Adhesive bond | 31 |
| Beveled or rounded segment | 32 |
| Crystal face | 33 |
| Limiting edge | 34 |
| Height of the pedestal element | hS |
| Height of the crystal | hK |
| Heating element | 40 |
| Light source | 50 |
| Light beam | 51 |
| FAC lens | 60 |
| Uncritical axis | 61 |
| Face | 62 |
| SAC lens | 70 |
| Power line | 80 |

The invention claimed is:

1. An optical bank comprising:
a carrier for receiving optical components;
at least one crystal mechanically coupled with the carrier for changing a frequency of a light irradiated into the at least one crystal from a light source;
at least two rails arranged on the carrier, the at least two rails being substantially parallel to each other, and each having at least one surface facing away from the carrier, wherein the at least one crystal is mechanically coupled with the carrier via the surfaces of the rails facing away from the carrier; and
a heat conducting element arranged on the crystal to heat the crystal, the heat conducting element abutting the surfaces of the rails facing away from the carrier.

2. The optical bank according to claim 1, wherein the at least one crystal is suspended on the heat conducting element.

3. The optical bank according to claim 2, wherein the heat conducting element comprises a substantially flat plate.

4. The optical bank according to claim 2, wherein the heat conducting element comprises a pedestal element to which the crystal is attached, wherein the pedestal element is substantially equidistant from areas on either of its sides where the heat conducting element abuts the surfaces of the rails.

5. The optical bank according to claim 2, wherein the heat conducting element comprises two pedestal elements that are substantially parallel to each other, and at least partially comprise areas where the heat conducting element abuts the surfaces of the rails, and wherein the at least one crystal is attached to the heat conducting element between the two pedestal elements.

6. The optical bank according to claim 5, wherein the pedestal elements each have a height hS, wherein the at least one crystal has a height hK, and wherein a ratio of heights hK/hS =0.44.

7. A method for manufacturing the optical bank according to claim 2, wherein while being adhesively bonded to the heat conducting element, the at least one crystal is heated to a temperature measuring 17/15 of the curing temperature of an adhesive so as to attach the at least one crystal to the heat conducting element.

8. The optical bank according to claim 1, wherein the at least one crystal is secured to the heat conducting element via an adhesively or cohesively acting bond.

9. The optical bank according to claim 1, wherein the at least one crystal is heatable, and is configured to adjust the light irradiated through the at least one crystal based on a change in crystal temperature.

10. The optical bank according to claim 1, further comprising at least one heating element for changing a temperature of the at least one crystal, the at least one heating element being arranged at a side of the heat conducting element opposite a side facing the at least one crystal.

11. The optical bank according to claim 1, further comprising at least one FAC lens arranged between the at least two rails, wherein the at least one FAC lens is attached via a respective adhesive bond between a face of the FAC lens and one of the at least two rails.

12. The optical bank according to claim 1, further comprising at least one light source mechanically coupled with the carrier to generate a beam of light to be guided through the at least one crystal.

13. The optical bank according to claim 1, wherein the heat conducting element comprises copper or a copper alloy.

14. The optical bank according to claim 1, further comprising power lines arranged on a top side of at least one of the rails, the top side being configured for the mechanical coupling with the at least one crystal.

* * * * *

UNITED STATES PATENT AND TRADEMARK OFFICE
CERTIFICATE OF CORRECTION

PATENT NO. : 8,659,815 B2  Page 1 of 1
APPLICATION NO. : 13/377123
DATED : February 25, 2014
INVENTOR(S) : Sahm et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 226 days.

Signed and Sealed this

Twenty-ninth Day of September, 2015

Michelle K. Lee
*Director of the United States Patent and Trademark Office*